(12) United States Patent
Mitsumoto

(10) Patent No.: US 11,799,079 B2
(45) Date of Patent: Oct. 24, 2023

(54) SPINEL TYPE LITHIUM NICKEL MANGANESE-CONTAINING COMPOSITE OXIDE

(71) Applicant: Mitsui Mining & Smelting Co., Ltd., Tokyo (JP)

(72) Inventor: Tetsuya Mitsumoto, Takehara (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 831 days.

(21) Appl. No.: 16/492,716

(22) PCT Filed: Feb. 28, 2018

(86) PCT No.: PCT/JP2018/007548
§ 371 (c)(1),
(2) Date: Sep. 10, 2019

(87) PCT Pub. No.: WO2018/168470
PCT Pub. Date: Sep. 20, 2018

(65) Prior Publication Data
US 2021/0143421 A1    May 13, 2021

(30) Foreign Application Priority Data

Mar. 14, 2017  (JP) ................. 2017-048384

(51) Int. Cl.
  *H01M 4/525*   (2010.01)
  *H01M 4/505*   (2010.01)
  *H01M 10/0525* (2010.01)
  *C01G 53/00*   (2006.01)
  *H01M 4/02*    (2006.01)

(52) U.S. Cl.
  CPC ............ *H01M 4/525* (2013.01); *C01G 53/66* (2013.01); *H01M 4/505* (2013.01); *H01M 10/0525* (2013.01); *C01P 2002/52* (2013.01); *C01P 2002/72* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/028* (2013.01)

(58) Field of Classification Search
  CPC .. H01M 4/525; H01M 4/505; H01M 10/0525; C01G 53/66; C01P 2002/52; C01P 2002/72; C01P 2004/61; C01P 2006/11; C01P 2006/12; C01P 2006/40
  See application file for complete search history.

(56) References Cited

U.S. PATENT DOCUMENTS

| 6,337,158 | B1 | 1/2002 | Nakajima et al. | |
|---|---|---|---|---|
| 9,537,140 | B2 | 1/2017 | Shibamura et al. | |
| 2013/0313471 | A1* | 11/2013 | Endo | H01M 4/0471 429/223 |
| 2014/0034872 | A1* | 2/2014 | Watanabe | C30B 1/02 252/182.1 |
| 2014/0367610 | A1* | 12/2014 | Noguchi | H01M 4/505 252/182.1 |
| 2015/0147652 | A1* | 5/2015 | Shibamura | H01M 4/525 429/223 |
| 2016/0285092 | A1 | 9/2016 | Kawasaki et al. | |

FOREIGN PATENT DOCUMENTS

| JP | H1173962 A | 3/1999 | |
|---|---|---|---|
| JP | 2000235857 A | 8/2000 | |
| JP | 2001-176557 | * 6/2001 | ............ H01M 10/40 |
| JP | 2003197194 A | 7/2003 | |
| JP | 2005116321 A | 4/2005 | |
| JP | 2012116720 A | 6/2012 | |
| JP | 2014238976 A | 12/2014 | |
| JP | 2016181500 A | 10/2016 | |
| WO | 2013161949 A1 | 10/2013 | |

OTHER PUBLICATIONS

Duan et al. Ceramics international vol. 472021 pp. 32025-32032 online Aug. 10, 2021.*
JP 2001-176557 Google English Machine translation Jun. 2001; printed Aug. 19, 2022 (Year: 2022).*

* cited by examiner

*Primary Examiner* — Jonathan G Jelsma
(74) *Attorney, Agent, or Firm* — The Webb Law Firm

(57) ABSTRACT

Provided is a 5 V class spinel type lithium nickel manganese-containing composite oxide having an operating potential of 4.5 V or more with respect to a metal Li reference potential, wherein the composite oxide is able to improve cycle characteristics while suppressing the amount of gas generated under high temperature environments and, moreover, to improve output characteristics while suppressing a shoulder on discharge at around 4.1 V in a charge and discharge curve. The spinel type lithium nickel manganese-containing composite oxide is represented by a general formula $[Li(Li_a Ni_y Mn_x Ti_b Mg_z M_\alpha)O_{4-\delta}]$ (where $0<a$, $0<b$, $0.30 \leq y < 0.60$, $0<z$, $0 \leq \alpha$, $x=2-a-b-y-z-\alpha<1.7$, $3 \leq b/a \leq 8$, $0.11 < b+z+\alpha$, $0<z/b<1$, $0 \leq \delta \leq 0.2$, and M represents one or two or more elements selected from the group consisting of Fe, Co, Ba, Cr, W, Mo, Y, Zr, Nb, P, and Ce).

19 Claims, No Drawings

SPINEL TYPE LITHIUM NICKEL MANGANESE-CONTAINING COMPOSITE OXIDE

CROSS-REFERENCE TO RELATED APPLICATIONS

This application is the United States national phase of International Application No. PCT/JP2018/007548 filed Feb. 28, 2018, and claims priority to Japanese Patent Application No. 2017-048384 filed Mar. 14, 2017, the disclosures of which are hereby incorporated by reference in their entirety.

TECHNICAL FIELD

The present invention relates to a spinel type lithium nickel manganese-containing composite oxide that can be used as a positive electrode active material for lithium secondary batteries, and more particularly, to a spinel type lithium nickel manganese-containing composite oxide having an operating potential of 4.5 V or more with respect to a metal Li reference potential (referred to as "5 V class").

BACKGROUND ART

Lithium secondary batteries have characteristics of high energy density, long life, and the like. Therefore, the lithium secondary batteries are widely used as power supplies for electric appliances such as video cameras, portable electronic devices such as laptop computers and mobile telephones, and electric tools such as power tools. Recently, the lithium secondary batteries are also applied to large-sized batteries that are mounted in electric vehicles (EVs), hybrid electric vehicles (HEVs), and the like.

The lithium secondary battery is a secondary battery having a structure in which, at the time of charging, lithium begins to dissolve as ions from the positive electrode and moves to the negative electrode to be stored therein, and at the time of discharging, lithium ions return from the negative electrode to the positive electrode, and it is known that the higher energy density of the lithium secondary battery is attributable to the electric potential of the positive electrode material.

Known examples of this kind of positive electrode active material for lithium secondary batteries include lithium transition metal oxides having a layered structure, such as $LiCoO_2$, $LiNiO_2$, and $LiMnO_2$, and lithium transition metal oxides having a manganese-based spinel structure (Fd-3m), such as $LiMn_2O_4$ and $LiNi_{0.5}Mn_{1.5}O_4$.

Since spinel type lithium nickel manganese-containing composite oxides of this kind are provided at low prices of raw materials, are non-toxic and safe, and have properties of being resistant to over-charging, attention is paid to them as the next-generation positive electrode active material for the large-sized batteries of electric vehicles (EVs), hybrid electric vehicles (HEVs), and the like. Furthermore, since spinel type lithium transition metal oxides that are capable of three-dimensionally intercalating and deintercalating of Li ions have superior output characteristics compared with lithium transition metal oxides having a layered structure such as $LiCoO_2$, it is expected to be used in an application where excellent output characteristics are required, such as in batteries for EVs and batteries for HEVs.

Among others, it has been known to have an operating potential at near 5 V by substituting a part of the Mn sites in $LiMn_2O_4$ with other transition metals (Cr, Co, Ni, Fe, or Cu). Thus, at present, development of a (5 V class) spinel type lithium manganese-containing composite oxide having an operating potential of 4.5 V or more (also referred to as "5 V class spinel") is being actively carried out.

For example, Patent Document 1 discloses, as a positive electrode active material for lithium secondary batteries exhibiting an electromotive force of 5 V class, a high capacity spinel type lithium manganese composite oxide positive electrode active material, comprising a spinel type lithium manganese composite oxide added with chromium as an essential additive component, and further, nickel or cobalt.

Patent Document 2 discloses a crystal having a spinel structure, $LiMn_{2-y-z}Ni_yM_zO_4$ (where M represents at least one selected from the group consisting of Fe, Co, Ti, V, Mg, Zn, Ga, Nb, Mo, and Cu, $0.25 \leq y \leq 0.6$, and $0 \leq z \leq 0.1$), which performs charging and discharging at a potential of 4.5 V or more with respect to a Li metal.

Patent Document 3 discloses a spinel type lithium manganese composite oxide that can be represented by $Li_a(M_xMn_{2-x-y}A_y)O_4$ (where $0.4 < x$, $0 < y$, $x+y < 2$, $0 < a < 1.2$, M includes one or more metal elements which are selected from the group consisting of Ni, Co, Fe, Cr, and Cu and include at least Ni, and A includes at least one metal element selected from Si and Ti; however, the value of the ratio y of A is $0.1 < y$ in a case where A includes only Ti), as a positive electrode material for lithium ion secondary batteries having a high energy density so as to have a high voltage of 4.5V or more with respect to Li.

Patent Document 4 discloses, as a positive electrode active material which has a high capacity density by having both the tap density of the positive electrode active material and the initial discharge capacity of a secondary battery formed by using the positive electrode active material, a lithium nickel manganese composite oxide having a spinel structure represented by a formula (I): $Li_{1+x}Ni_{0.5-1/4x-1/4y}Mn_{1.5-3/4x-3/4y}B_yO_4$ (where in the formula (I), x and y are $0 \leq x \leq 0.025$, and $0 < y \leq 0.01$), wherein the median diameter is 5 to 20 μm, the coefficient of variation of particle size is 2.0 to 3.5%, and the BET specific surface area is 0.30 to 1.30 m²/g.

Further, Patent Document 5 discloses, as a new 5 V class spinel capable of suppressing the amount of gas generation during high temperature cycles, a spinel type lithium nickel manganese-containing composite oxide represented by $Li[Ni_yMn_{2-(a+b)-y-z}Li_aTi_bM_z]O_4$ (where $0 \leq z \leq 0.3$, $0.3 \leq y < 0.6$, and M represents at least one or more metal elements selected from the group consisting of Al, Mg, Fe, and Co), wherein the following relationships are satisfied: $a > 0$, $b > 0$, and $2 \leq b/a \leq 8$ in the above formula.

Furthermore, Patent Document 6 discloses a positive electrode active material for nonaqueous electrolyte secondary batteries that can be represented by a compositional formula $Li_aMn_{2-x-y-b}Ni_{x-z}T_{y+z}A_bO_4$ (where $0.92 \leq a \leq 1.12$, $0.45 \leq x \leq 0.55$, $0 \leq y < 0.10$, $0.0010 \leq z \leq 0.20$, $0.0010 \leq y+z \leq 0.20$, $0.0010 < b \leq 0.025$, $z > y$, T represents one or more elements selected from Co, Fe, Cr, Al, Ga, Ti, and Si, and A represents one or more elements selected from Mg and Zn), wherein a diffraction pattern of a spinel type crystal structure of symmetry Fd-3m is shown by XRD measurement, and the oxidation number of Mn is 3.97 or more and 4.00 or less in the oxidation number analysis of transition metal according to a potassium dichromate titration method.

CITATION LIST

Patent Document

Patent Document 1: Japanese Patent Laid-Open No. H11-73962
Patent Document 2: Japanese Patent Laid-Open No. 2000-235857
Patent Document 3: Japanese Patent Laid-Open No. 2003-197194
Patent Document 4: Japanese Patent Laid-Open No. 2012-116720
Patent Document 5: International Publication No. WO 2013/161949
Patent Document 6: Japanese Patent Laid-Open No. 2014-238976

SUMMARY OF THE INVENTION

Problem to be Solved by the Invention

Spinel type lithium nickel manganese-containing composite oxides capable of realizing the high energy density lithium ion secondary batteries that have been suggested hitherto, particularly 5 V class spinels having an operating potential of 4.5 V or more with respect to a metal Li reference potential have a problem of improving the cycle characteristics as well as a problem that the amount of gas generation under high temperature environments is generally high.

As for the 5 V class spinels having an operating potential of 4.5 V or more with respect to a metal Li reference potential, enhancing the capacity in a high potential region is important in increasing the energy density.

Further, in regard to the lithium ion secondary batteries, enhancing the output characteristics is always one of the important development problems.

Thus, the present invention relates to a 5 V class spinel type lithium nickel manganese-containing composite oxide having an operating potential of 4.5 V or more with respect to a metal Li reference potential, and provides a novel 5 V class spinel type lithium nickel manganese-containing composite oxide, wherein the amount of gas generated under high temperature environments can be suppressed, the cycle characteristics can be improved, a shoulder on discharge at around 4.1 V in a charge and discharge curve can be suppressed, and the output characteristics can be further enhanced.

Means for Solving Problem

The present invention proposes a spinel type lithium nickel manganese-containing composite oxide, which is represented by a general formula [Li(Li$_a$Ni$_y$Mn$_x$Ti$_b$Mg$_z$M$_\alpha$)O$_{4-\delta}$](where 0<a, 0<b, 0.30≤y<0.60, 0<z, 0≤α, x=2−a−b−y−z−α<1.7, 3≤b/a≤8, 0.11<b+z+α, 0<z/b≤1, 0≤δ≤0.2, and M represents one or two or more elements selected from the group consisting of Fe, Co, Ba, Cr, W, Mo, Y, Zr, Nb, P, and Ce).

The present invention also proposes a spinel type lithium nickel manganese-containing composite oxide, which is represented by a general formula [Li(Li$_a$Ni$_y$Mn$_x$Ti$_b$Mg$_z$M$_\alpha$)O$_{4-\delta}$] (where 0<a≤0.20, 0.08≤b, 0.30≤y<0.60, 0<z<0.15, 0≤α, x=2−a−b−y−z−α<1.7, 3≤b/a≤8, 0.11<b+z+α≤0.3, 0<z/b≤1, 0≤δ≤0.2, and M represents one or two or more elements selected from the group consisting of Fe, Co, Ba, Cr, W, Mo, Y, Zr, Nb, P, and Ce).

Effect of the Invention

The spinel type lithium nickel manganese-containing composite oxide proposed by the present invention has an operating potential of 4.5 V or more with respect to a metal Li reference potential, and is able to improve the cycle characteristics while suppressing the amount of gas generated under high temperature environments. Moreover, a shoulder on discharge at around 4.1 V in a charge and discharge curve can be suppressed, and the output characteristics can be further enhanced. Accordingly, the spinel type lithium nickel manganese-containing composite oxide proposed by the present invention can be suitably used as a positive electrode active material for various lithium batteries.

DETAILED DESCRIPTION OF MODE(S) FOR CARRYING OUT THE INVENTION

Next, the present invention will be described based on exemplary embodiments. However, the present invention is not limited to the embodiments described below.

<Present 5 V Class Spinel>

The spinel type lithium nickel manganese-containing composite oxide according to one example of embodiments of the present invention (referred to as "present 5 V class spinel") is a spinel type (space group: Fd-3m or P4$_3$32) lithium nickel manganese-containing composite oxide, which is represented by a general formula (1): Li(Li$_a$Ni$_y$Mn$_x$Ti$_b$Mg$_z$M$_\alpha$)O$_{4-\delta}$ (where a, b, x, y, z, α, and δ are numerical values), having an operating potential of 4.5 V or more with respect to a metal Li reference potential.

Here, the "having an operating potential of 4.5 V or more with respect to a metal Li reference potential" is meant to include a case in which the present 5 V class spinel need not have only an operating potential of 4.5 V or more as a plateau region, and has a part of operating potential of 4.5V or more.

From this point of view, the present 5 V class spinel is not limited to a lithium nickel manganese-containing composite oxide composed only of the "5 V class lithium nickel manganese-containing composite oxide" having an operating potential of 4.5 V or more as a plateau region. For example, the present 5 V class spinel may contain a "4 V class lithium nickel manganese-containing composite oxide" having an operating potential of less than 4.5 V as a plateau region. Specifically, the present 5 V class spinel may be 30% by mass or more of the whole positive electrode material, and preferably 50% by mass or more thereof, more preferably 80% by mass or more thereof (including 100% by mass).

In an X-ray diffraction pattern measured by a powder X-ray diffractometer (XRD) using CuKα1 rays, when the present 5 V class spinel is fitted to a crystal structure model of a cubic crystal of a space group Fd-3m (Origin Choice 2), Rwp and S which represent the degree of coincidence of an observed intensity with a calculated intensity may be Rwp<10 or S<2.6. At this time, when Rwp and S are Rwp<10 or S<2.6, it can be said that the observed intensity and the calculated intensity are sufficiently coincident.

From such a viewpoint, Rwp is preferably Rwp<8 among the above range, and more preferably Rwp<5. Sis preferably 1.0<S or S<2.3 among the above range, and more preferably S<2.1.

The ratio "b/a" in the general formula (1) means a molar ratio of Ti with respect to Li in the 16d site, and when the ratio is in the range of 3≤b/a≤8, the amount of gas generation can be reduced.

From such a viewpoint, the ratio b/a in the general formula (1) is preferably 3≤b/a≤8, more preferably 3.3≤b/a or b/a≤7.

In addition, from the viewpoints of the stabilization of the spinel structure and the production stability, "a" may be 0<a. Among others, it is preferably 0<a≤0.20, more preferably 0.02≤a or a≤0.10.

From the viewpoints of stabilizing the spinel structure and suppressing the gas generation, "b" which represents a molar ratio of Ti in the general formula (1) may be 0<b. Among others, it is preferably 0.08≤b or b<0.29, more preferably 0.10≤b. In particular, when "b" is 0.10≤ b, the amount of the gas generation can be more effectively suppressed.

From the viewpoint of maintaining the charge and discharge capacity in a high potential region, "y" which represents a molar ratio of Ni in the general formula (1) may be 0.30≤y<0.60. Among others, it is preferably 0.32≤y or y≤0.55, more preferably 0.35≤y or y≤0.52. When y in the general formula (1) is in the above range, the 5 V capacity can be maintained, and the occurrence of a different phase other than the spinel can be suppressed.

In addition, "z" which represents a molar ratio of Mg in the general formula (1) may be 0<z. Among others, it is preferably 0<z<0.15, more preferably 0.005≤z or z≤0.12, even more preferably 0.01≤z or z≤0.10.

The relationship between "b" which represents a molar ratio of Ti and "z" which represents a molar ratio of Mg preferably satisfies a relationship of 0<z/b≤1 from the viewpoint of achieving a balance between suppressing a shoulder on discharge at around 4.1 V in a charge and discharge curve and the output characteristics. That is, the molar ratio b of Ti is preferably not less than the molar ratio z of Mg. Among others, it is more preferably 0.025<z/b<1, even more preferably 0.040≤z/b or z/b<0.75, still more preferably z/b≤0.50.

Also, the relationship among "b" which represents a molar ratio of Ti, "z" which represents a molar ratio of Mg, and "α" which represents a molar ratio of M element preferably satisfies a relationship of 0.11<b+z+α from the viewpoint of improving the cycle characteristics by the stabilization of the spinel structure. Among others, the relationship is more preferably 0.15<b+z+α or b+z+α≤0.3, even more preferably 0.20<b+z+α.

Further, from the viewpoints of stabilizing the crystal structure and preventing the decrease in capacity, "x (=2-a-b-y-z-α)" which represents a molar ratio of Mn in the general formula (1) is preferably x<1.7, more preferably 1.0<x or x≤1.6, even more preferably 1.2<x or x≤1.5, still more preferably x≤1.4.

Furthermore, the molar ratios in the general formula (1) preferably satisfies a relationship of a+y+x+b+z+α=2.00. This is because, when satisfying a+y+x+b+z+α=2.00, it may be considered as a ratio of $AB_2O_4$, which is a spinel structure, and thus the present 5 V class spinel has a spinel structure.

In the general formula (1), M in the formula may be or may not be included. That is, "α" which represents a molar ratio of M may be α≥0.

Here, M in the formula may be, for example, one or two or more elements selected from the group consisting of Fe, Co, Ba, Cr, W, Mo, Y, Zr, Nb, Ce and P. Among these elements, Fe and Co are substitution elements contributing in exhibiting an operating potential of 4.5 V or more with respect to a metal Li reference potential, and are able to act as an auxiliary role of Ni having the same role. On the other hand, the elements of Ba, Cr, W, Mo, Y, Zr, Nb, Ce, and P have a common feature that they are substitution elements mainly contributing in stabilizing the crystal structure to enhance the characteristics. By containing these elements, that is, the M elements in the present 5 V class spinel, there is a possibility that the effect of stabilizing the spinel structure can be further obtained.

Here, "4-δ" in the general formula indicates that the present 5 V class spinel may also contain oxygen deficiency, and part of oxygen may be substituted with other elements such as fluorine. The parameter "δ" is preferably 0 or more or 0.2 or less, more preferably 0.1 or less, even more preferably 0.05 or less.

The present 5 V class spinel may contain other elements other than Li, Mn, Ni, Ti, Mg, M elements, and O when the contents are 0.5% by mass or less respectively. This is because it may be considered that the performance of the present 5 V class spinel is not almost affected in the amount to this extent.

(S Content)

In the present 5 V class spinel, the sulfur content (S content) measured by inductively coupled plasma (ICP) emission spectroscopy is preferably less than 0.20 wt %.

The S content measured by inductively coupled plasma (ICP) emission spectroscopy can be considered as a substitute indicator of the amount of sulfate such as $Li_2SO_4$ that is attached to the particle surface. When the S content is set to less than 0.2 wt %, the amount of sulfate that is attached to the particle surface can be reduced more than the desired reference. The sulfate present on the surface becomes a resistance component, and thus, by reducing the amount of the sulfate on the surface, the output characteristics can be improved.

From such a viewpoint, the S content of the present 5 V class spinel is preferably less than 0.20 wt %. Among others, it is more preferably 0.10 wt % or less, even more preferably 0.05 wt % or less.

Examples of the method for adjusting the S content to less than 0.20 wt % in the present 5 V class spinel may include a method of water washing. In the water washing, the conditions, such as water amount, water temperature, and slurry concentration, may be adjusted, and particularly, it is preferred that the conductivity of the washing water after washing is decreased to be 10 mS/cm or less as a guideline and the water content rate of the cake obtained after solid-liquid separation is reduced to be 30% or less as a guideline. However, it is not limited to such a method.

(Na Content, K Content, and Ca Content)

Na salt, K salt, and Ca salt that are attached to the particle surface may also become resistance components, and thus, by reducing the Na content, K content, and Ca content, the output characteristics can be improved.

From such a viewpoint, the sodium content (Na content), which is measured by atomic absorption spectrometry, in the present 5 V class spinel is preferably less than 300 ppm. Among others, it is more preferably less than 200 ppm, even more preferably less than 100 ppm, still more preferably less than 60 ppm.

From the same viewpoint, the potassium content (K content), which is measured by atomic absorption spectrometry, in the present 5 V class spinel is preferably less than 200 ppm. Among others, it is more preferably less than 100 ppm, even more preferably less than 70 ppm, still more preferably less than 40 ppm.

From the same viewpoint, the calcium content (Ca content), which is measured by inductively coupled plasma (ICP) emission spectroscopy, in the present 5 V class spinel is preferably less than 200 ppm. Among others, it is more preferably less than 180 ppm, even more preferably less than 160 ppm, still more preferably less than 150 ppm.

Examples of the method for adjusting the Na content, the K content, and the Ca content to the above ranges in the present 5 V class spinel may include a method of water washing. In the water washing, the conditions, such as water amount, water temperature, and slurry concentration, may be adjusted. Particularly, it is preferred that the conductivity of the washing water after washing is decreased to be 10 mS/cm or less as a guideline and the water content rate of the cake obtained after solid-liquid separation is reduced to be 30% or less as a guideline. However, it is not limited to such a method.

(Average Particle Diameter (D50))

An average particle diameter (D50) of the present 5 V class spinel, that is, an average particle diameter (D50) determined by a laser diffraction scattering type particle size distribution measurement method, is preferably 4 to 25 μm. The D50 is preferably 4 μm or more because a problem in kneading and mixing the slurry is hardly occurred. In addition, the D50 is preferably 25 μm or less because a risk that particles break through a separator and short circuit occurs is decreased.

From such a viewpoint, the average particle diameter (D50) of the present 5 V class spinel is preferably 4 to 25 μm. Among others, it is more preferably more than 4 μm or 23 μm or less, even more preferably 5 μm or more or 21 μm or less.

In order to adjust the D50 of the present 5 V class spinel to the above ranges, it is preferable to perform an adjustment of D50 of starting materials, an adjustment of calcination temperature or calcination time, or an adjustment of D50 by crushing after the calcination. However, it is not limited to these adjustment methods.

(Specific Surface Area)

From the viewpoint of reactivity with an electrolyte solution, a specific surface area (SSA) of the present 5 V class spinel is preferably 0.1 to 2.0 $m^2/g$. Among others, it is more preferably 0.2 $m^2/g$ or more or 1.8 $m^2/g$ or less, even more preferably 1.5 $m^2/g$ or less, still more preferably 1.2 $m^2/g$ or less.

It is generally a technical common sense that the larger specific surface area becomes, the larger amount of gas generation becomes. However, the present 5 V class spinel is characterized in the point that the amount of gas generation can be remarkably suppressed although having a specific surface area of on the same order as conventional spinel type lithium nickel manganese-containing composite oxides.

In order to adjust the specific surface area of the present 5 V class spinel to the above ranges, the present 5 V class spinel may be produced by adjusting a raw material particle size, calcination temperature and time, crushing strength, and a classification level.

(Tap Density)

A tap density of the present 5 V class spinel is preferably 0.9 $g/cm^3$ or more. Among others, it is more preferably 1.0 $g/cm^3$ or more or 3.0 $g/cm^3$ or less, even more preferably 1.2 $g/cm^3$ or more or 2.8 $g/cm^3$ or less, still more preferably 1.5 $g/cm^3$ or more or 2.6 $g/cm^3$ or less.

When the tap density of the present 5 V class spinel is 0.9 $g/cm^3$ or more as described above, the electrode density can be enhanced, and thus the volumetric energy density can be enhanced.

In order to adjust the tap density of the present 5 V class spinel to 0.9 $g/cm^3$ or more, it is preferable to produce the present 5 V class spinel by calcining at a high temperature of 770° C. or more, adding a material which enhances the reactivity in calcination, such as a boron compound and a fluorine compound, followed by calcining, or using a compact raw material. However, it is not limited to this method.

(Lattice Strain)

A lattice strain of the present 5 V class spinel is preferably less than 0.12%. Among others, it is more preferably less than 0.10%, even more preferably less than 0.07%.

When the lattice strain is less than 0.12%, the framework of the spinel type lithium nickel manganese-containing composite oxide becomes sufficiently rigid, and when used as a positive electrode active material for a lithium secondary battery, the output characteristics (rate characteristics), the high-temperature charge-discharge cycle ability, and the rapid-charge characteristics can be enhanced.

In order to adjust the lattice strain of the present 5 V class spinel to the above ranges, wet type pulverization conditions, calcining conditions, heat treatment conditions, and the like may be adjusted. Among others, it is preferable to adjust wet type pulverization conditions. However, it is not limited to this method.

<X-Ray Diffraction>

In the present 5 V class spinel, it is preferable that, in an X-ray diffraction pattern measured by a powder X-ray diffractometer (XRD) using CuKα1 rays, a peak is present in a range of 14.0 to 16.5° at 2θ. When a peak is present in a range of 14.0 to 16.5° at 2θ in the X-ray diffraction pattern, a shoulder at near 4.1 V can be suppressed, a high potential capacity region can be expanded to enhance the energy density, and the amount of gas generation can be suppressed, compared to the spinel in which the peak is not present in a range of 14.0 to 16.5° at 2θ in the X-ray diffraction pattern.

Here, in regard to whether or not a peak is present in a range of 14.0 to 16.5° at 2θ, in the XRD pattern, the average value of cps in ranges of 14.0 to 14.5° and 16.0 to 16.5° at 2θ is adopted as an intensity A of a background (BG) and a maximum value of cps in a range of 14.5 to 16.0° is adopted as a peak intensity B, and when the difference (B−A) is 40 cps or more, it can be determined that a peak is present. It can be considered that the effect of the present invention can be enjoyed when the difference is larger, and thus the difference is preferably 50 cps or more, more preferably 60 cps or more, even more preferably 70 cps or more.

Further, in the X-ray diffraction pattern measured by a powder X-ray diffractometer (XRD) using CuKα1 rays, it is preferable for the present 5 V class spinel to have a ratio of a peak intensity of the peak that is the highest in the peaks present in a range of 14.0 to 16.5° at 2θ with respect to a peak intensity of the peak that is the highest in the peaks present in a range of 18 to 19° at 2θ (P14-16.5°/P18-19°) being more than 0.05%. Among others, the ratio is more preferably 2.0% or less, even more preferably 1.0% or less, still more preferably 0.5% or less, particularly preferably less than 0.28%.

In order to produce the present 5 V class spinel such that a peak is present in a range of 14.0 to 16.5° at 2θ, it is preferable that the 5 V class spinel type lithium nickel manganese-containing composite oxide as an object to be treated is subjected to heat treatment (post-pulverizing heat treatment), as described later. However, it is not limited to such a method.

<Method for Producing Present 5 V Class Spinel>

The present 5 V class spinel can be obtained by mixing raw materials such as a lithium compound, a manganese compound, a nickel compound, a titanium compound, a magnesium compound, and optionally other raw materials, pulverizing the mixture using a wet type pulverizer or the like, subsequently granulating and drying the pulverized product using a thermal spray dryer or the like, calcining and heat treating the granulated and dried product, and optionally classifying the resulting product.

In so doing, it is preferable to design the raw material composition such that the molar ratio of Ti with respect to Li in the 16d site where Mn resides, is 3 to 8.

However, the production method for the present 5 V class spinel is not limited to such a production method. For example, a granulated powder that is supplied to calcination may also be produced according to a so-called co-precipitation method. Further, washing may be performed in the respective steps (see "washing" described below).

Examples of the lithium compound may include lithium hydroxide (LiOH), lithium carbonate ($Li_2CO_3$), lithium nitrate ($LiNO_3$), $LiOH \cdot H_2O$, lithium oxide ($Li_2O$), another fatty acid lithium, and lithium halides. Among others, hydroxide salt, carbonate, and nitrate of lithium are preferred.

The manganese compound is not particularly limited. For example, manganese carbonate, manganese nitrate, manganese chloride, manganese dioxide, dimanganese trioxide, trimanganese tetraoxide, and the like can be used, and among others, manganese carbonate and manganese dioxide are preferred. Among others, electrolytic manganese dioxide that is obtained by an electrolytic method is more preferable.

The kind of the nickel compound is also not particularly limited. For example, nickel carbonate, nickel nitrate, nickel chloride, nickel oxyhydroxide, nickel hydroxide, nickel oxide, and the like can be used. Among others, nickel carbonate, nickel hydroxide, and nickel oxide are preferred.

As the titanium (Ti) and magnesium (Mg) compounds, carbonate salt, nitrate salt, chloride, oxyhydroxide salt, hydroxide, oxide, and the like of the titanium (Ti) and magnesium (Mg) metals can be used.

As the method for mixing the raw materials, it is preferable to add a liquid medium such as water or a dispersant to the raw materials and to form a slurry by wet mixing them together, and it is preferable to pulverize the resulting slurry using a wet type pulverizer. However, it may be dry type pulverized.

In addition, it is preferable to pulverize the resulting product such that the average particle diameter (D50) becomes 0.1 to 1.0 μm.

The granulation method may be a wet type method or a dry type method as long as the raw materials that are pulverized in the previous step are dispersed in the granulated particles without being separated, and may be an extrusion granulation method, a rolling granulation method, a fluidized bed granulation method, a mixing granulation method, a spray drying granulation method, a pressure molding granulation method, or a flake granulation method using a roll or the like. However, in the case of performing the wet type granulation, sufficient drying before the calcination is needed. The drying may be performed by known drying methods such as a spray thermal drying method, a hot-air drying method, a vacuum drying method, and a freeze-drying method, and among others, a spray thermal drying method is preferred. The spray thermal drying method is preferably performed using a thermal spray drying machine (spray dryer).

The calcination is preferably performed in a calcining furnace under an air atmosphere, an atmosphere whose oxygen partial pressure is adjusted, a carbon dioxide gas-containing atmosphere, or the other atmosphere so as to maintain a temperature of 770 to 950° C., preferably 800 to 950° C. (:meaning the temperature when a thermocouple is brought into contact with a calcination product in a calcining furnace) for 0.5 to 300 hours. In so doing, it is preferable to select calcining conditions in which transition metals are dissolved at an atomic level to form a single phase.

It is not preferable to perform the calcination at a temperature higher than 950° C., especially at 1,000° C. or more since the oxygen deficiency cannot be recovered even if annealing, and thereby it is difficult to produce the present 5 V class spinel.

The kind of the calcination furnace is not particularly limited. The calcination can be performed by using, for example, a rotary kiln, a stationary furnace, or other calcination furnaces.

The heat treatment is preferably performed under an air atmosphere, an atmosphere whose oxygen partial pressure is adjusted, a carbon dioxide gas-containing atmosphere, or the other atmosphere, in an environment of 500 to 800° C., preferably 600° C. or more or 750° C. or less for 0.5 to 300 hours so as to easily incorporate oxygen into the crystal structure. In so doing, when the temperature is lower than 500° C., the effect of the heat treatment is hardly obtained, and there is a risk that oxygen may not be incorporated. In addition, when the heat treatment is performed at a temperature higher than 800° C., desorption of oxygen begins, and the effect intended by the present invention cannot be obtained.

In the heat treatment, the heat treatment atmosphere may be set to an atmosphere where the overall pressure of the treatment atmosphere is a pressure higher than air pressure (0.1 MPa), for example, more than 0.19 MPa, preferably 0.20 MPa or more, as necessary.

However, when the overall pressure of the treatment atmosphere is too high, there is a possibility that the production becomes unstable due to a problem on strength of the pressurized furnace. Therefore, from such a viewpoint, the heat treatment is preferably performed at an atmosphere pressure of 1.5 MPa or less, more preferably 1.0 MPa or less.

By performing the heat treatment in such a pressuring state, oxygen is more easily incorporated, and thus the oxygen deficiency can be further suppressed.

(Washing)

An object to be treated to washing may be, for example, the raw materials before mixing of the raw materials, the raw material mixed powder after mixing of the raw materials, the treated powder after the heat treatment, the treated object obtained from the calcination, and the treated powder obtained from the crushing and classification described later. One or two or more kinds of these may be washed.

In the washing, it is preferable to bring an object to be treated (powder) into contact with a polar solvent, and to wash the powder so as to separate impurities contained in the powder.

For example, the object to be treated (powder) and a polar solvent are mixed and stirred to obtain a slurry, and the slurry thus obtained may be subjected to solid-liquid separation by filtration or the like, so as to eliminate impurities. In so doing, the solid-liquid separation may be performed at a subsequent step.

Here, the slurry means a state in which the treated powder is dispersed in the polar solvent.

For the polar solvent to be used for washing, water is preferably used.

The water may be tap water, but it is preferable to use ion-exchanged water or pure water that has been passed through a filter or a wet type magnetic separator.

The pH of water is preferably 4 to 10, and among others, the pH is more preferably 5 or more or 9 or less.

In regard to the liquid temperature at the time of washing, it has been confirmed that when the liquid temperature at the time of washing is low, the battery characteristics become more satisfactory. Therefore, from such a viewpoint, the liquid temperature is preferably 5 to 70° C., and among others, more preferably 60° C. or less, even more preferably 45° C. or less, still more preferably 40° C. or less, furthermore preferably 30° C. or less.

The reason why the battery characteristics become more satisfactory when the liquid temperature at the time of washing is low, can be considered that when the liquid temperature is too high, lithium in the lithium nickel manganese-containing composite oxide is ion-exchanged with protons in the ion-exchanged water, thereby the lithium is removed, and the high temperature characteristics are then affected.

In regard to the amount of the polar solvent that is brought into contact with the object to be treated (powder), it is preferable to adjust a mass ratio of the lithium nickel manganese-containing composite oxide with respect to a total mass of the polar solvent and the lithium nickel manganese-containing composite oxide (also referred to as "slurry concentration") to 10 to 70 wt %, more preferably 20 wt % or more or 60 wt % or less, even more preferably 30 wt % or more or 50 wt % or less. When the amount of the polar solvent is 10 wt % or more, impurities such as $SO_4$ are easily eluted, and on the contrary, when the amount of the polar solvent is 60 wt % or less, a washing effect adequate for the amount of the polar solvent can be obtained.

Here, in the case of washing the raw materials before mixing of the raw materials and the raw material mixed powder after mixing of the raw materials, a method in which the raw materials or the raw material mixed powder is introduced into a washing liquid, followed by stirred, left to stand, and then a supernatant is eliminated, may be employed.

In addition, when the treated object obtained from the calcination, that is, the spinel type lithium nickel manganese-containing composite oxide is washed, it may be introduced into a washing liquid, followed by stirred, left to stand, and then a supernatant may be eliminated. For example, it is preferable that the spinel type lithium nickel manganese-containing composite oxide is introduced into a washing liquid, stirred for 20 minutes, and left to stand for 10 minutes to thereby eliminate the supernatant and the impurities of the spinel type lithium nickel manganese-containing composite oxide contained in the supernatant. By washing as described above, the amount of impurities in the spinel type lithium nickel manganese-containing composite oxide, for example, the S content can be decreased.

Further, when the treated object after the heat treatment is washed, the spinel type lithium nickel manganese-containing composite oxide obtained by the heat treatment may be introduced into a washing liquid, followed by stirred, left to stand, and then a supernatant may be eliminated. For example, it is preferable that the spinel type lithium nickel manganese-containing composite oxide is introduced into a washing liquid, stirred for 20 minutes, and left to stand for 10 minutes to thereby eliminate the supernatant and the impurities of the spinel type lithium nickel manganese-containing composite oxide contained in the supernatant.

<Application of Present 5 V Class Spinel>

The present 5 V class spinel is able to exhibit an operating potential of 4.5 V or more (5 V class) with respect to a metal Li reference potential, and has an excellent discharge capacity retention rate during high temperature (for example, 45° C.) cycles.

Therefore, the present 5 V class spinel can be effectively used, for example, as a positive electrode active material for various lithium batteries, after being crushed and classified as necessary.

In the case of using the present 5 V class spinel as a positive electrode active material for various lithium batteries, a positive electrode mixture can be produced by mixing, for example, the present 5 V class spinel, a conductive material formed from carbon black or the like, and a binder formed from a TEFLON (registered trademark) binder or the like. Then, a lithium battery can be constituted by using such a positive electrode mixture as a positive electrode, using lithium or a material capable of intercalating and deintercalating lithium, such as carbon, as a negative electrode, and using a solution in which a lithium salt such as lithium hexafluorophosphate ($LiPF_6$) is dissolved in a mixed solvent such as ethylene carbonate-dimethyl carbonate as a non-aqueous electrolyte.

A lithium battery constituted in this manner can be used, for example, in electronic devices such as laptop computers, mobile phones, cordless telephone handsets, video movies, liquid crystal televisions, electric shavers, portable radios, headphone stereos, backup power supplies, and memory cards, medical devices such as pacemakers and hearing aids, and driving power supplies for being mounted in electric vehicles. Among others, the lithium battery is particularly effective as various kinds of portable computers such as mobile phones, PDAs (portable information terminals), and laptop computers, electric vehicles (including hybrid vehicles), and driving power supplies for electric power storage, which require excellent cycle characteristics.

The present 5 V class spinel can be suitably used as a positive electrode active material for an all-solid type lithium secondary battery using a solid electrolyte.

In so doing, the present 5 V class spinel alone may be used as a positive electrode active material for an all-solid type lithium secondary battery, or the present 5 V class spinel may be used by mixing with the other positive electrode active material, for example, a positive electrode active material composed of the present core particles or a positive electrode active material composed of the other composition, such as $LiCoO_2$, $LiNiO_2$, $LiMnO_2$, $LiMn_2O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (where $0<x<\frac{1}{3}$), $LiFePO_4$, or $LiMn_{1-z}M_zPO_4$ (where $0<z\leq0.1$ and M represents at least one element selected from the group consisting of Co, Ni, Fe, Mg, Zn, and Cu). However, in the case of mixing with the other positive electrode active material, the present 5 V class spinel is preferably mixed so as to occupy 50 wt % or more.

Examples of the solid electrolyte for an all-solid type lithium secondary battery may include a compound represented by $Li_{7-x}PS_{6-x}Ha_x$ (Ha is halogen). Among others, a solid electrolyte containing sulfur, for example, a solid electrolyte composed of a compound containing lithium, phosphorus, sulfur, and halogen, and having a cubic argyrodite type crystal structure, can be cited.

Examples of the negative electrode active material for an all-solid type lithium secondary battery may include a negative electrode active material containing carbon such as artificial graphite, natural graphite, or non-graphitizing carbon (hard carbon). In addition, silicon or tin promising as a high capacity material can also be used as an active material.

Explanation of Terms

In the case of being expressed as the term "X to Y" (X and Y are arbitrary numbers) in the present description, unless otherwise stated, the term includes the meaning of "preferably more than X" or "preferably less than Y" along with the meaning "not less than X and not more than Y".

Further, in the case of being expressed as the term "X or more" (X is an arbitrary number) or the term "Y or less" (Y is an arbitrary number), the term also includes the intention of being "preferably more than X" or "preferably less than Y".

EXAMPLES

Next, the present invention will be described in more detail by way of Examples and Comparative Examples that were actually produced. However, the present invention is not limited to Examples described below.

Example 1

Lithium carbonate having an average particle diameter (D50) of 7 µm, electrolytic manganese dioxide having an average particle diameter (D50) of 23 µm and a specific surface area of 40 $m^2$/g, nickel hydroxide having an average particle diameter (D50) of 22 µm, titanium oxide having an average particle diameter (D50) of 1 µm, and magnesium oxide having an average particle diameter (D50) of 3 µm were respectively weighed in molar ratios shown in Table 1.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, the Mn raw material, the Ti raw material, and the Mg raw material; and the dispersant was sufficiently dissolved in and mixed with the ion-exchanged water. Among the raw materials that had been weighed, only the Ni raw material, the Mn raw material, and the Mg raw material were added to the ion-exchanged water in which the dispersant was dissolved in advance, and the resulting mixture was mixed and stirred to obtain a slurry. The obtained slurry was pulverized using a wet type pulverizer at 1,300 rpm for 120 minutes. Subsequently, the Li raw material and the Ti raw material were added thereto, and the resulting mixture was mixed and stirred to prepare a slurry having a solid content concentration of 40 wt %. Further, the slurry was pulverized using a wet type pulverizer at 1,300 rpm for 120 minutes, thereby obtaining a pulverized slurry having an average particle diameter (D50) of 0.50 µm or less.

The pulverized slurry thus obtained was granulated and dried using a thermal spray drying machine (Spray Dryer "RL-10", manufactured by Ohkawara Kakohki Co., Ltd.). In so doing, a twin-jet nozzle was used for spraying, and the granulation and drying was performed under conditions where the spray pressure was set to 0.43 MPa, the slurry supply amount was set to 320 ml/min, and the temperature was adjusted such that an outlet temperature of a drying tower became 100 to 110° C.

The obtained granulated powder was calcined using a stationary electric furnace at 850° C. for 37 hours under the air, and was then heat treated at 740° C. for 37 hours under the air. The calcined powder thus obtained by heat treating was classified with a sieve having a mesh size of 53 µm, and the powder under the sieve was collected as a spinel type lithium nickel manganese-containing composite oxide powder.

Next, 1 kg of the spinel type lithium nickel manganese-containing composite oxide powder that was obtained by collecting the powder under the sieve was introduced into a plastic beaker (capacity of 5,000 mL) that was filled with ion-exchanged water of 2,000 mL having a pH of 6 to 7 and a temperature of 25° C., and the content was stirred using a stirrer (propeller area of 33 $cm^2$) at a rotation speed of 400 to 550 rpm for 20 minutes. After stirring, the stirring was stopped, the stirrer was taken out from the water, and the resulting stirred sample was left to stand for 10 minutes. Then, the supernatant was eliminated by decantation, and the residual was subjected to solid-liquid separation by using a suction filtration machine (filter paper No. 131).

An additional washing was performed to the precipitate (cake) that was subjected to solid-liquid separation by using another ion-exchanged water of 2,000 mL.

The obtained cake was recovered, and the precipitate thus recovered was dried in an environment of 120° C. for 12 hours. Thereafter, the resulting product was dried for 7 hours in a state of being heated so as to have the product temperature of 500° C. After drying, the resulting dried product was classified with a sieve having a mesh size of 53 µm, and the powder under the sieve was collected to obtain a spinel type lithium nickel manganese-containing composite oxide powder.

Further, the spinel type lithium nickel manganese-containing composite oxide powder was pressure heat treated in oxygen-containing atmosphere using a pressurized furnace (manufactured by Hirochiku Co., Ltd.). That is, 200 g of the spinel type lithium nickel manganese-containing composite oxide powder was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa. The ceramic crucible was then heated at a temperature-rise rate of 1.7° C./min up to 650° C. and maintained for 15 hours, and thereafter cooled at a temperature-fall rate of 0.3° C./min down to room temperature while continuing oxygen inflow, thereby obtaining a spinel type lithium nickel manganese-containing composite oxide powder (sample).

Chemical analysis of the obtained sample was performed. The contents of the elements were Li: 4.2 wt %, Ni: 14.4 wt %, Mn: 40.9 wt %, Ti: 5.2 wt %, and Mg: 0.1 wt %; and the molar ratios of the elements were listed in Table 1.

Example 2

A spinel type lithium nickel manganese-containing composite oxide powder (sample) was obtained in the same manner as in Example 1 except that the weighed values of the raw materials were changed so as to be molar ratios shown in Table 1, the spray pressure was changed to 0.40 MPa, the slurry supply amount was changed to 310 ml/min, and the calcination temperature was changed to 840° C.

Chemical analysis of the obtained sample was performed. The contents of the elements were Li: 4.2 wt %, Ni: 14.2 wt %, Mn: 40.8 wt %, Ti: 5.3 wt %, and Mg: 0.3 wt %; and the molar ratios of the elements were listed in Table 1.

Example 3

A spinel type lithium nickel manganese-containing composite oxide powder (sample) was obtained in the same manner as in Example 1 except that the weighed values of lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, magnesium oxide having an average particle diameter (D50) of 3 μm, and zirconium oxide having an average particle diameter (D50) of 2 μm were changed so as to be molar ratios shown in Table 1, the spray pressure was changed to 0.40 MPa, the slurry supply amount was changed to 315 ml/min, and the calcination temperature was changed to 840° C.

Chemical analysis of the obtained sample was performed. The contents of the elements were Li: 4.2 wt %, Ni: 14.2 wt %, Mn: 40.5 wt %, Ti: 5.3 wt %, Mg: 0.6 wt %, and Zr: 0.02 wt %; and the molar ratios of the elements were listed in Table 1.

Example 4

A spinel type lithium nickel manganese-containing composite oxide powder (sample) was obtained in the same manner as in Example 1 except that the weighed values of the raw materials were changed so as to be molar ratios shown in Table 1, the slurry having a solid content concentration of 35 wt % was prepared, the spray pressure was changed to 0.44 MPa, the slurry supply amount was changed to 310 ml/min, and the calcination temperature was changed to 840° C.

Chemical analysis of the obtained sample was performed. The contents of the elements were Li: 4.2 wt %, Ni: 13.9 wt %, Mn: 39.8 wt %, Ti: 5.3 wt %, and Mg: 1.0 wt %; and the molar ratios of the elements were listed in Table 1.

Example 5

A spinel type lithium nickel manganese-containing composite oxide powder (sample) was obtained in the same manner as in Example 1 except that the weighed values of lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, magnesium oxide having an average particle diameter (D50) of 3 μm, and cobalt hydroxide having an average particle diameter (D50) of 1 μm were changed so as to be molar ratios shown in Table 1, the spray pressure was changed to 0.41 MPa, the slurry supply amount was changed to 330 ml/min, and the calcination temperature was changed to 860° C.

Chemical analysis of the obtained sample was performed. The contents of the elements were Li: 4.2 wt %, Ni: 14.1 wt %, Mn: 40.2 wt %, Ti: 5.4 wt %, Mg: 1.3 wt %, and Co: 0.02 wt %; and the molar ratios of the elements were listed in Table 1.

Comparative Example 1

Lithium carbonate having an average particle diameter (D50) of 7 μm, electrolytic manganese dioxide having an average particle diameter (D50) of 23 μm and a specific surface area of 40 m$^2$/g, and nickel hydroxide having an average particle diameter (D50) of 22 μm were respectively weighed in molar ratios shown in Table 1.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, and the Mn raw material; and the dispersant was sufficiently dissolved in and mixed with the ion-exchanged water. The raw materials that had been weighed were added to the ion-exchanged water in which the dispersant was dissolved in advance, and the resulting mixture was mixed and stirred to prepare a slurry having a solid content concentration of 40 wt %.

The obtained slurry was pulverized using a wet type pulverizer at 1,300 rpm for 120 minutes to have an average particle diameter (D50) of 0.60 μm or less.

The pulverized slurry thus obtained was granulated and dried using a thermal spray drying machine (Spray Dryer "RL-10", manufactured by Ohkawara Kakohki Co., Ltd.). In so doing, a twin-jet nozzle was used for spraying, and the granulation and drying was performed under conditions where the spray pressure was set to 0.19 MPa, the slurry supply amount was set to 350 ml/min, and the temperature was adjusted such that an outlet temperature of a drying tower became 100 to 110° C.

The obtained granulated powder was calcined using a stationary electric furnace at 950° C. for 37 hours under the air, and was then heat treated at 750° C. for 37 hours under the air.

The calcined powder thus obtained by heat treating was classified with a sieve having a mesh size of 53 μm, and the powder under the sieve was collected to obtain a spinel type lithium nickel manganese-containing composite oxide powder (sample).

Chemical analysis of the obtained sample was performed. The contents of the elements were Li: 3.9 wt %, Ni: 16.0 wt %, and Mn: 43.0 wt %; and the molar ratios of the elements were listed in Table 1.

Comparative Example 2

Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, and titanium oxide having an average particle diameter (D50) of 2 μm were respectively weighed in molar ratios shown in Table 1.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, the Mn raw material, and the Ti raw material; and the dispersant was sufficiently dissolved in and mixed with the ion-exchanged water. The raw materials that had been weighed were added to the ion-exchanged water in which the dispersant was dissolved in advance, and the resulting mixture was mixed and stirred to prepare a slurry having a solid content concentration of 40 wt %. The obtained slurry was pulverized using a wet type pulverizer at 1,300 rpm for 60 minutes to obtain a pulverized slurry having an average particle diameter (D50) of 0.60 μm or less.

The pulverized slurry thus obtained was granulated and dried using a thermal spray drying machine (Spray Dryer "RL-10", manufactured by Ohkawara Kakohki Co., Ltd.). In so doing, a twin-jet nozzle was used for spraying, and the granulation and drying was performed under conditions where the spray pressure was set to 0.46 MPa, the slurry supply amount was set to 250 ml/min, and the temperature was adjusted such that an outlet temperature of a drying tower became 100 to 110° C.

The obtained granulated powder was calcined using a stationary electric furnace at 800° C. for 37 hours under the air.

The obtained calcined powder was crushed using a pestle and classified with a sieve having a mesh size of 53 μm, thereby obtaining a spinel type lithium nickel manganese-containing composite oxide powder (sample).

Chemical analysis of the obtained sample was performed. The contents of the elements were Li: 3.9 wt %, Ni: 15.9 wt %, Mn: 39.5 wt %, and Ti: 4.9 wt %; and the molar ratios of the elements were listed in Table 1.

Comparative Example 3

Mixed liquid obtained by dissolving hydrate crystals of nickel sulfate, manganese sulfate, cobalt sulfate, and magnesium sulfate in ion-exchanged water (Mn:Ni:Co:Mg=1.495:0.400:0.100:0.005 in terms of element molar ratio) and ammonia water were dropped at a prescribed flow rate in a reaction vessel containing ion-exchanged water that was heated to 40° C. in advance, and sodium hydroxide was dropped therein so as to maintain a pH of 11.5, thereby obtaining a nickel manganese cobalt-containing composite hydroxide slurry as a precursor by the reactive crystallization. Next, the resulting nickel manganese cobalt-containing composite hydroxide slurry was filtered and dried to obtain a powder. Lithium hydroxide monohydrate was mixed in the resulting powder.

Next, the atmosphere was set to the air, and the resulting powder was calcined using a calcining furnace at 1,000° C. for 12 hours. After cooling, it was re-calcined using a calcining furnace at 700° C. for 36 hours. The obtained calcined powder was crushed using a pestle and classified with a sieve having a mesh size of 53 μm, thereby obtaining a lithium nickel manganese cobalt-containing composite oxide powder (sample).

Chemical analysis of the obtained sample was performed. The contents of the elements were Li: 3.9 wt %, Ni: 12.8 wt %, Mn: 44.8 wt %, Co: 3.2 wt %, and Mg: 0.07 wt %; and the molar ratios of the elements were listed in Table 1.

Comparative Example 4

A lithium nickel manganese titanium-containing composite oxide powder (sample) was obtained in the same manner as in Comparative Example 3 except that cobalt sulfate was changed to titanium sulfate solution, and the weighed values of the raw materials were changed.

Chemical analysis of the obtained sample was performed. The contents of the elements were Li: 3.8 wt %, Ni: 14.5 wt %, Mn: 45.2 wt %, Ti: 1.3 wt %, and Mg: 0.07 wt %; and the molar ratios of the elements were listed in Table 1.

<Method for Measuring Physical Property Values>

Physical property values of the spinel type lithium nickel manganese-containing composite oxide powder (sample) obtained in each of Examples and Comparative Examples were measured as follows.

(Chemical Analysis)

As for the spinel type lithium nickel manganese-containing composite oxide powder (sample) obtained in each of Examples and Comparative Examples, the contents of the respective elements were measured by inductively coupled plasma (ICP) emission spectroscopy.

The composition ratios calculated from the contents of Li, Ni, Mn, Ti, Mg, and the M element, that is, the molar ratios were listed in Table 1.

Also, the S content and Ca content were measured in the same manner, and the results were listed as S content (wt %) and Ca content (ppm) in Table 2.

(Na Content and K Content)

The Na content and K content of the lithium nickel manganese-containing composite oxide powder (sample) obtained in each of Examples and Comparative Examples were measured by atomic absorption spectrometry, and the results were listed as Na content (ppm) and K content (ppm) in Table 2.

(D50)

As for the spinel type lithium nickel manganese-containing composite oxide powder (sample) obtained in each of Examples and Comparative Examples, the sample (powder) was introduced into a watersoluble solvent using an automatic sample supply machine for laser diffraction particle size distribution measuring apparatus ("Microtrac SDC", manufactured by Nikkiso Co., Ltd.), and was irradiated with ultrasonic waves of 40 W at a flow rate of 40% for 360 seconds. Subsequently, the particle size distribution was measured using a laser diffraction particle size distribution measuring apparatus "MT3000II" manufactured by Nikkiso Co., Ltd., and a value of D50 was measured from a chart of the volume-based particle size distribution thus obtained.

Here, at the time of the measurement, the watersoluble solvent was filtered through a filter having a pore size of 60 μm, and the average value, which is obtained by performing two measurements under the conditions of a solvent refractive index of 1.33, penetration for the particle penetrability conditions, a particle refractive index of 2.46, a non-spherical shape, a measurement range of 0.133 to 704.0 μm, and a measurement time of 30 seconds, was defined as D50.

(Specific Surface Area)

The specific surface area (SSA) of the spinel type lithium nickel manganese-containing composite oxide powder (sample) obtained in each of Examples and Comparative Examples was measured as follows.

First, 2.0 g of the sample (powder) was weighed in a glass cell (standard cell) for an automatic specific surface area analyzer, Macsorb (manufactured by Mountech Co., Ltd.), and was set in an auto sampler. The inside of the glass cell was replaced by a nitrogen gas, and then a heat treatment was performed at 250° C. for 15 minutes in the nitrogen gas atmosphere. Thereafter, it was cooled for 4 minutes while allowing a mixed gas of nitrogen and helium to flow. After the cooling, the sample (powder) was measured by a BET one-point method.

Here, as the adsorption gas in the cooling and measurement, a mixed gas of 30% of nitrogen and 70% of helium was used.

(Tap Density)

The powder filling density (tap density, g/cm$^3$) was determined in such a manner that 30 g of the spinel type lithium nickel manganese-containing composite oxide powder (sample) obtained in each of Examples and Comparative Examples was put in a 150 ml glass measuring cylinder, and the measuring cylinder was tapped 350 times in a stroke of 60 mm using a shaking specific gravity meter (KRS-409, manufactured by Kuramochi Kagaku Kikai Seisakusho K.K.).

(Identification of Crystal Structure and Lattice Constant)

The XRD measurement was performed under the following measurement condition 1 using an XRD measurement apparatus (apparatus name "Ultima IV", manufactured by Rigaku Corp.) to obtain an XRD pattern. In regard to the obtained XRD pattern, the crystal phase information was determined using an integrated X-ray powder diffraction software PDXL (manufactured by Rigaku Corp.), and was refined by a WPPF (whole powder pattern fitting) method to obtain a lattice constant. Here, on the assumption that the crystal phase information is attributed to a cubic crystal of a space group Fd-3m (Origin Choice 2), and the 8a site is occupied by Li, the 16d site is occupied by Mn, Ti, Mg, M element, and an excessive Li content a, and the 32e site is occupied by 0, a seat occupancy and an atomic displacement parameter B on each site were fixed to 1, and the calculation was repeatedly performed until Rwp and S which represent the degree of coincidence of an observed intensity with a calculated intensity converged. The observed intensity and the calculated intensity are sufficiently coincident, which means that the obtained sample is not limited to the space group, and there is a high reliability for the obtained sample to have a spinel-type crystal structure.

=XRD Measurement Condition 1=

X-ray source: CuKα (line focus), wavelength: 1.541836 Å

Operation axis: 2θ/θ, measurement method: continuous, counting unit: cps

Initiation angle: 15.0°, termination angle: 120.0°, number of integration times: 1 time Sampling width: 0.01°, scanning speed: 1.0°/min Voltage: 40 kV, current: 40 mA Divergence slit: 0.2 mm, divergence vertical restriction slit: 10 mm Scattering slit: opening, light-receiving slit: opening Offset angle: 0°

Goniometer radius: 285 mm, optical system: focusing method

Attachment: ASC-48

Slit: slit for D/teX Ultra

Detector: D/teX Ultra

Incident-monochro: CBO

Ni-Kβ filter: None

Speed of revolution: 50 rpm (Lattice Strain)

The lattice strain was calculated using the X-ray diffraction pattern obtained in the XRD measurement condition 1. In other words, the crystal phase information of the obtained XRD pattern was determined using an integrated X-ray powder diffraction software PDXL (manufactured by Rigaku Corp.), and was refined by a WPPF (whole powder pattern fitting) method. Thereafter, the analysis object was analyzed by using a method of analyzing a crystallite size and a lattice strain as a hall method.

(Confirmation of Presence or Absence of Peak in a Range of 14.0 to 16.5° at 2θ)

The XRD measurement was performed under the following measurement condition 2 using an XRD measurement apparatus (apparatus name "Ultima IV", manufactured by Rigaku Corporation) to obtain an XRD pattern.

=XRD Measurement Condition 2=

X-ray source: CuKα (line focus), wavelength: 1.541836 Å

Operation axis: 2θ/θ, measurement method: continuous, counting unit: cps

Initiation angle: 14.0°, termination angle: 16.5°, number of integration times: 8 times Sampling width: 0.01°, scanning speed: 0.1°/min Voltage: 40 kV, current: 40 mA Divergence slit: 0.2 mm, divergence vertical restriction slit: 10 mm Scattering slit: opening, light-receiving slit: opening Offset angle: 0°

Goniometer radius: 285 mm, optical system: focusing method

Attachment: ASC-48

Slit: slit for D/teX Ultra

Detector: D/teX Ultra

Incident-monochro: CBO

Ni-Kβ filter: None

Speed of revolution: 50 rpm

The presence or absence of the peak was determined as follows.

First, in the obtained XRD pattern, an average value of cps in ranges of 14.0 to 14.5° and 16.0° to 16.5° at 2θ was adopted as an intensity A of the background (BG).

Next, when a maximum value of cps in a range of 14.5 to 16.0 was adopted as a peak intensity B, and a difference ("B−A") between the peak intensity B and the intensity A of the background (BG) was 40 cps or more, it was determined that the peak was present.

Then, when the peak was present in a range of 14.0 to 16.5°, "○" was shown in the table, and when it was not present, "×" was shown.

In addition, a ratio (%) of a peak intensity of the peak that is the highest in the peaks present in a range of 14.0 to 16.5° at 2θ of the pattern obtained in the XRD measurement condition 2 with respect to a peak intensity of the peak that is the highest in the peaks present in a range of 18 to 19° at 2θ of the pattern obtained in the XRD measurement condition 1 was shown as "P14.0-16.5°/P18-19°".

<Evaluation of Battery>

A 2032 type coin battery and a laminate type battery were produced by using the spinel type lithium nickel manganese-containing composite oxide powder (sample) produced in each of Examples and Comparative Examples as a positive electrode active material, and the following battery performance evaluation test, rate characteristics evaluation test, cycle characteristics evaluation test, gas generation evaluation test, and output characteristics evaluation test were performed using these batteries.

(Production of Coin Battery)

89 parts by mass of the spinel type lithium nickel manganese-containing composite oxide powder (sample) produced in each of Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass) using a planetary stirring and defoaming apparatus (MAZERUSTAR KK-50S, manufactured by Kurabo Industries Ltd.).

In so doing, the PVDF was dissolved in the NMP in advance, and the positive electrode active material and the acetylene black were added thereto. The resulting mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that the temperature was maintained at 70° C. for 2 minutes. Thereafter, the resulting heated sample was dried such that the temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm, and was press-consolidated using a roll-press machine at a linear pressure of 1.5 t/cm. The resulting consolidated foil was then punched to a size of ϕ13 mm. Next, the resulting punched foil was heated up from room temperature to 200° C. in a vacuum state, and was heated and dried such that the temperature was maintained at 200° C. for 6 hours, thereby serving as a positive electrode.

Li metal with a size of ϕ14 mm×thickness of 0.6 mm was adopted as a negative electrode, and a separator that was impregnated with an electrolytic solution prepared by dissolving $LiPF_6$ in a carbonate-based mixed solvent so as to be 1 mol/L, was placed, thereby producing a 2032 type coin battery.

(Battery Performance Evaluation Test)

The 2032 type coin battery prepared as described above was left to stand for 12 hours, and was then subjected to an initial activation according to a method described in the following. The battery was charged at 25° C. in a 0.1 C constant current/constant potential up to 4.999 V, and thereafter discharged in a 0.1 C constant current down to 3.0 V. This process was repeated in three cycles. Here, the current value actually set was calculated from the content of the positive electrode active material in the positive electrode.

In the above evaluation, the ratio "B/A" was determined when A denoted a discharge capacity in a range of 4.999 to 3.0 V and B denoted a discharge capacity in a range of 4.1 to 3.0 V. It can be evaluated that as the ratio of B/A becomes smaller, a shoulder around 4.1 V can be more suppressed.

(Rate Characteristics Evaluation Test)

The rate characteristics evaluation test was performed using the coin battery after being evaluated of the discharge capacity as described above. The battery was charged at 25° C. in a 0.1 C constant current/constant potential up to 4.999 V, and thereafter discharged in a 3 C constant current down to 3.0V. In the above evaluation, the discharge capacity in a range of 4.999 to 3.0 V in 3 C was determined. The discharge capacity in 3 C/the discharge capacity in 0.1 C×100 was calculated to be served as an index of the rate characteristics. Here, the relative values were listed in Table 3 when the value of Comparative Example 4 was set at 100.

(Production of Laminate Type Battery)

89 parts by mass of the spinel type lithium nickel manganese-containing composite oxide powder (sample) produced in each of Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass) using a planetary stirring and defoaming apparatus (MAZERUSTAR KK-50S, manufactured by Kurabo Industries Ltd.).

In so doing, the PVDF was dissolved in the NMP in advance, and the positive electrode active material and the acetylene black were added thereto. The resulting mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that the temperature was maintained at 70° C. for 2 minutes. Thereafter, the resulting heated sample was dried such that the temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm, and was press-consolidated using a roll-press machine at a linear pressure of 1.5 t/cm. The resulting consolidated foil was then punched into a square of 40 mm×29 mm. Next, the resulting punched foil was heated up from room temperature to 200° C. in a vacuum state, and was heated and dried such that the temperature was maintained at 200° C. for 6 hours, thereby serving as a positive electrode.

The positive electrode sheet thus obtained was served as a positive electrode, and a negative electrode sheet (electrode capacity of 1.6 mAh/cm², manufactured by Piotrek Co., Ltd.) on which natural spherical graphite was coated was cut to a size of 3.1 cm×4.2 cm to serve as a negative electrode. A separator (porous polyethylene film) that was impregnated with an electrolytic solution prepared by dissolving $LiPF_6$ in a carbonate-based mixed solvent so as to be 1 mol/L, was interposed between the positive electrode and the negative electrode, thereby producing a laminate type battery.

(Evaluation of 45° C. Cycle Characteristics)

The laminate type battery produced as described above was left to stand for 12 hours, and was then subjected to an initial activation according to a method described in the following. The battery was charged at 25° C. in a 0.1 C constant current/constant potential up to 4.8 V, and thereafter discharged in a 0.1 C constant current down to 3.5 V. This process was repeated in three cycles. Here, the current value actually set was calculated from the content of the positive electrode active material in the positive electrode.

The charge and discharge test was performed using the laminate type battery after being subjected to the initial activation as described above according to the following method, and the 45° C. cycle characteristics, that is, the high-temperature cycle characteristics were evaluated.

A cell was put in an environmental testing chamber whose environmental temperature for charging and discharging the battery was set at 45° C. to be able to be charged and discharged. The cell was left to stand for 4 hours such that the cell temperature became the environmental temperature, and thereafter, with the charge and discharge range being set at 4.8 to 3.5 V, the charge and discharge was performed one cycle in which the charge was performed in a 0.1 C constant current/constant potential and the discharge was performed in a 0.1 C constant current. Thereafter, the charge and discharge cycle at 1 C was performed 198 times, and the charge and discharge cycle at 0.1 C was then performed 1 time.

200 cycles of the charging and discharging was performed in total. The C rates were calculated on the basis of 25° C. in the initial activation and the discharge capacity at the 3rd cycle.

The percentage (%) of the value obtained by dividing the discharge capacity at 0.1 C in the 200th cycle by the discharge capacity at 0.1 C in the 1st cycle was determined as a value of the 45° C. cycle characteristics, that is, the high-temperature charge-discharge cycle ability.

In Table 3, the value of the cycle characteristics in each of Examples and Comparative Examples was listed as a relative value when the value of the cycle characteristics in Comparative Example 1 was taken as 100.

(Gas Generation Evaluation Test)

The laminate type battery produced as described above was left to stand for 12 hours, and then the battery was charged to 4.9 V at 25° C. in a 0.05 C constant current/constant potential, and thereafter discharged to 3.0 V in a constant current. Thereafter, the measurement environment temperature was set to 45° C., and the laminate type battery was left to stand for 4 hours. Subsequently, the battery was charged to 4.9 V at 0.05 C and maintained the voltage for 7 days, and thereafter discharged to 3.0 V. An amount of gas generation (mL) generated up to this stage was measured by a volumetric immersion method (solvent replacement method based on Archimedes' principle). An amount of gas generation per positive electrode active material amount (mL/g) was calculated from the obtained gas generation amount and the positive electrode active material amount in the positive electrode sheet. Here, the amount of gas generation in each of Examples and Comparative Examples was listed as a relative value in Table 3 when the amount of Comparative Example 2 was taken as 100.

(Output Characteristics Evaluation Test)

The laminate type battery produced as described above was left to stand for 12 hours, and then the battery was charged to 4.9 V at 25° C. in a 0.05 C constant current/constant potential, and thereafter discharged to 3.0 V in a constant current. Thereafter, the battery was charged to 4.9 V in a 0.1 C constant current/constant potential, and then discharged to 3.0 V in a constant current. This process was repeated in 2 cycles. The battery was charged up to the capacity equivalent to 60% when the discharge capacity at 0.1 C in the 2nd cycle was taken as 100% (hereinafter, referred to as SOC60%). The laminate type battery that was charged to SOC60% was discharged at a current value equivalent to 3 C, which was calculated from the discharge capacity, using an electrochemical measurement system (HZ-7000, manufactured by Hokuto Denko Corp.) for 10 seconds, and was open-circuited for 75 seconds.

As an index of the output evaluation, a value of $W=1/(W1-W2)\times100$ was used. Each of the values is as follows.

$$W1=V1\times I,\ W2=V2\times I$$

A current value equivalent to 3 C is denoted as I, a natural potential just before starting the measurement is denoted as V1, and a potential when a 3 C current is applied for 10 seconds is denoted as V2. In addition, an output value just before starting the measurement is denoted as W1, and an output value after the measurement is denoted as W2. Accordingly, (W1−W2) means an amount of reduction of the output, and when its inverse number becomes large, it means that the amount of reduction of the output is small, that is, the output characteristics are improved.

Here, in Table 1, each of the values was listed as a relative value when the value of Comparative Example 1 was taken as 100.

TABLE 1

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Li (1 + a) | — | 1.055 | 1.057 | 1.050 | 1.058 | 1.044 | 1.035 | 1.025 | 1.014 | 1.005 |
| Ni (y) | — | 0.432 | 0.425 | 0.423 | 0.414 | 0.412 | 0.508 | 0.492 | 0.400 | 0.449 |
| Mn (x) | — | 1.311 | 1.303 | 1.290 | 1.266 | 1.256 | 1.457 | 1.299 | 1.493 | 1.498 |
| Ti (b) | — | 0.192 | 0.193 | 0.192 | 0.192 | 0.195 | 0 | 0.183 | 0.000 | 0.048 |
| Mg (z) | — | 0.010 | 0.022 | 0.045 | 0.069 | 0.092 | 0 | 0 | 0.005 | 0.005 |
| M element (α) | — | 0 | 0 | 0.001 | 0 | 0.001 | 0 | 0 | 0.102 | 0 |
| a + y + x + b + z + α | — | 2.00 | 2.00 | 2.00 | 2.00 | 2.00 | 2.00 | 2.00 | 2.01 | 2.01 |
| b/a | — | 3.5 | 3.4 | 3.8 | 3.3 | 4.4 | 0.0 | 7.3 | 0.0 | 9.6 |
| b + z + α | — | 0.20 | 0.22 | 0.24 | 0.26 | 0.29 | 0.00 | 0.18 | 0.11 | 0.06 |
| z/b | — | 0.05 | 0.11 | 0.23 | 0.36 | 0.47 | — | — | — | 0.10 |

TABLE 2

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| S content | wt % | 0.04 | 0.03 | 0.04 | 0.05 | 0.08 | 0.29 | 0.25 | — | — |
| Na content | ppm | 40 | 20 | 30 | 40 | 50 | 310 | 380 | — | — |
| K content | ppm | 30 | 40 | 40 | 40 | 50 | 240 | 260 | — | — |
| Ca content | ppm | 110 | 120 | 140 | 140 | 140 | 160 | 140 | — | — |

TABLE 3

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| D50 | μm | 9 | 8 | 8 | 8 | 8 | 17 | 8 | 15 | 22 |
| SSA | m$^2$/g | 1.1 | 1.2 | 1.2 | 1.2 | 1.0 | 0.3 | 3.6 | 0.5 | 0.4 |
| Tap density | g/cm$^3$ | 1.3 | 1.1 | 1.2 | 1.1 | 1.2 | 1.7 | 1.0 | 2.0 | 1.8 |
| Lattice constant | Å | 8.189 | 8.189 | 8.190 | 8.192 | 8.195 | 8.170 | 8.188 | 8.184 | 8.189 |

TABLE 3-continued

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Rwp | — | 6.0 | 5.8 | 5.8 | 5.9 | 6.2 | 4.3 | 4.6 | 4.5 | 4.5 |
| S | — | 2.1 | 2.0 | 2.0 | 2.0 | 2.1 | 2.0 | 2.1 | 1.5 | 1.4 |
| Lattice strain | % | 0.014 | 0.019 | 0.017 | 0.022 | 0.020 | 0.008 | 0.077 | 0.128 | 0.230 |
| Presence or absence of peak in XRD 14.0-16.5° | — | ○ | ○ | ○ | ○ | ○ | X | X | X | X |
| B-A (peak is present when B/A is 40 cps or more) | cps | 79 | 84 | 84 | 79 | 83 | 16 | 18 | 35 | 39 |
| P14.0-16.5°/P18-19° | % | 0.16 | 0.17 | 0.18 | 0.17 | 0.17 | 0.04 | 0.04 | 0.13 | 0.28 |
| Discharge capacity ratio B/A | % | 3.4 | 3.2 | 2.9 | 2.9 | 2.9 | 2.8 | 6.0 | 19.4 | 12.4 |
| Rate characteristics 3 C/0.1 C | — | 102 | 104 | 116 | 119 | 122 | 90 | 95 | — | 100 |
| 45° cycle characteristics | — | 133 | 141 | 127 | 129 | 119 | 100 | 90 | — | — |
| Gas generation amount per positive electrode active material | — | 87 | 96 | 96 | 88 | 99 | 141 | 100 | — | — |
| Output characteristics | — | 135 | 124 | 138 | 138 | 147 | 100 | 78 | — | — |

CONSIDERATION

In any of Examples 1 to 5, it was confirmed by the XRD measurement and the analysis that the obtained lithium nickel manganese-containing composite oxide was a 5 V class spinel which was fitted to a crystal structure model of a cubic crystal of a space group Fd-3m (Origin Choice 2), and the Rwp and S which represented the degree of coincidence of an observed intensity with a calculated intensity satisfied Rwp<10 and S<2.6. In addition, from the results of the battery performance evaluation tests, it was confirmed that the obtained lithium nickel manganese-containing composite oxide had an operating potential of 4.5 V or more with respect to a metal Li reference potential.

In any of Examples 1 to 5, it was also confirmed that the obtained lithium nickel manganese-containing composite oxide was represented by the general formula [Li(Li$_a$Ni$_y$Mn$_x$Ti$_b$Mg$_z$M$_\alpha$)O$_{4-\delta}$] (where 0<a, 0<b, 0.30≤y<0.60, 0<z, 0≤α, x=2-a-b-y-z-α<1.7, 3≤b/a≤8, 0.11<b+z+α, 0<z/b≤1, 0≤δ≤0.2, and M represented one or two or more elements selected from the group consisting of Fe, Co, Ba, Cr, W, Mo, Y, Zr, Nb, P, and Ce).

As a result of the above Examples and a number of tests performed by the present inventors, it was found that, when a composite oxide was the lithium nickel manganese-containing composite oxide represented by the general formula [Li(Li$_a$Ni$_y$Mn$_x$Ti$_b$Mg$_z$M$_\alpha$)O$_{4-\delta}$] (where 0<a, 0<b, 0.30≤y<0.60, 0<z, 0≤α, x=2-a-b-y-z-α<1.7, 3≤b/a≤8, 0.11<b+z+α, 0<z/b≤1, 0≤δ≤0.2, and M represented one or two or more elements selected from the group consisting of Fe, Co, Ba, Cr, W, Mo, Y, Zr, Nb, P, and Ce), the cycle characteristics could be improved while suppressing the amount of gas generated under high temperature environments, and the output characteristics could be improved while suppressing a shoulder on discharge at 4.1 V in the charge and discharge curve.

From the results of the above Examples and the tests performed by the present inventors so far, when a composite oxide was the lithium nickel manganese-containing composite oxide having the above composition, Mn could be stably present in a tetravalent state, and Ni could mainly contribute to charge and discharge. Therefore, it could be considered that a shoulder on discharge at around 4.1 V could be suppressed, and the cycle characteristics could be improved.

The invention claimed is:

1. A spinel type lithium nickel manganese-containing composite oxide, which is represented by a general formula [Li(Li$_a$Ni$_y$Mn$_x$Ti$_b$Mg$_z$M$_\alpha$)O$_{4-\delta}$] (where 0<a, 0<b, 0.30≤y<0.60, 0<z, 0≤α, x=2-a-b-y-z-α<1.7, 3≤b/a≤8, 0.11<b+z+0, 0<z/b≤1, 0≤δ≤0.2, and M represents one or two or more elements selected from the group consisting of Fe, Co, Ba, Cr, W, Mo, Y, Zr, Nb, P, and Ce), wherein, in an X-ray diffraction pattern measured by a powder X-ray diffractometer (XRD) using CuKα1 rays, a ratio of a peak intensity of a peak that is the highest in peaks present in a range of 14.0 to 16.5° at 2θ with respect to a peak intensity of a peak that is the highest in peaks present in a range of 18 to 19° at 2θ is more than 0.05%.

2. The spinel type lithium nickel manganese-containing composite oxide according to claim 1, wherein, in the general formula, α=0.

3. The spinel type lithium nickel manganese-containing composite oxide according to claim 1, wherein, in the general formula, a ratio (z/b) of a molar ratio of Mg relative to a molar ratio of Ti is 0<z/b<1.

4. The spinel type lithium nickel manganese-containing composite oxide according to claim 1, wherein a sulfur content (S content) measured by inductively coupled plasma (ICP) emission spectroscopy is less than 0.20%.

5. The spinel type lithium nickel manganese-containing composite oxide according to claim 1, wherein a Na content measured by atomic absorption spectrometry is less than 300 ppm.

6. The spinel type lithium nickel manganese-containing composite oxide according to claim 1, wherein a K content measured by atomic absorption spectrometry is less than 200 ppm.

7. The spinel type lithium nickel manganese-containing composite oxide according to claim 1, wherein a Ca content measured by inductively coupled plasma (ICP) emission spectroscopy is less than 160 ppm.

8. The spinel type lithium nickel manganese-containing composite oxide according to claim 1, wherein a specific surface area is 0.1 m$^2$/g or more and 2.0 m$^2$/g or less.

9. The spinel type lithium nickel manganese-containing composite oxide according to claim 1, wherein an average particle diameter (D50) determined by a laser diffraction scattering type particle size distribution measurement method is 4 μm or more and 25 μm or less.

10. The spinel type lithium nickel manganese-containing composite oxide according to claim 1, wherein a tap density is 0.9 g/cm$^3$ or more.

11. The spinel type lithium nickel manganese-containing composite oxide according to claim 1, wherein a lattice strain is less than 0.12%.

12. A lithium secondary battery, comprising the spinel type lithium nickel manganese-containing composite oxide according to claim 1 as a positive electrode active material.

13. The spinel type lithium nickel manganese-containing composite oxide according to claim 1, wherein, in the general formula, 0.08≤b.

14. The spinel type lithium nickel manganese-containing composite oxide according to claim 1, wherein, in the general formula, 0.20<b+Z+α.

15. A spinel type lithium nickel manganese-containing composite oxide, which is represented by a general formula [Li(Li$_a$Ni$_y$Mn$_x$Ti$_b$Mg$_z$M$_\alpha$)O$_{4-\delta}$] (where 0<a≤0.20, 0.08≤b, 0.30≤y<0.60, 0<z<0.15, 0≤α, x=2−a−b−y−z−α<1.7, 3≤b/a≤8, 0.11<b+z+α≤0.3, 0<z/b≤1, 0≤δ≤0.2, and M represents one or two or more elements selected from the group consisting of Fe, Co, Ba, Cr, W, Mo, Y, Zr, Nb, P, and Ce), wherein, in an X-ray diffraction pattern measured by a powder X-ray diffractometer (XRD) using CuKα1 rays, a ratio of a peak intensity of a peak that is the highest in peaks present in a range of 14.0 to 16.5° at 2θ with respect to a peak intensity of a peak that is the highest in peaks present in a range of 18 to 19° at 2θ is more than 0.05%.

16. The spinel type lithium nickel manganese-containing composite oxide according to claim 15, wherein, in the general formula, α=0.

17. The spinel type lithium nickel manganese-containing composite oxide according to claim 15, wherein, in the general formula, a ratio (z/b) of a molar ratio of Mg relative to a molar ratio of Ti is 0<z/b<1.

18. A lithium secondary battery, comprising the spinel type lithium nickel manganese-containing composite oxide according to claim 15 as a positive electrode active material.

19. The spinel type lithium nickel manganese-containing composite oxide according to claim 15, wherein, in the general formula, 0.20<b+z+α.

* * * * *

UNITED STATES PATENT AND TRADEMARK OFFICE
CERTIFICATE OF CORRECTION

PATENT NO. : 11,799,079 B2
APPLICATION NO. : 16/492716
DATED : October 24, 2023
INVENTOR(S) : Tetsuya Mitsumoto It is certified that error appears in the above-identified patent and that said Letters Patent is hereby corrected as shown below:

In the Claims

Column 26, Line 26, Claim 1, delete "$<b+z+0,$" and insert -- $<b+z+\alpha,$ --

Signed and Sealed this
Second Day of January, 2024

Katherine Kelly Vidal
*Director of the United States Patent and Trademark Office*